UNITED STATES PATENT OFFICE.

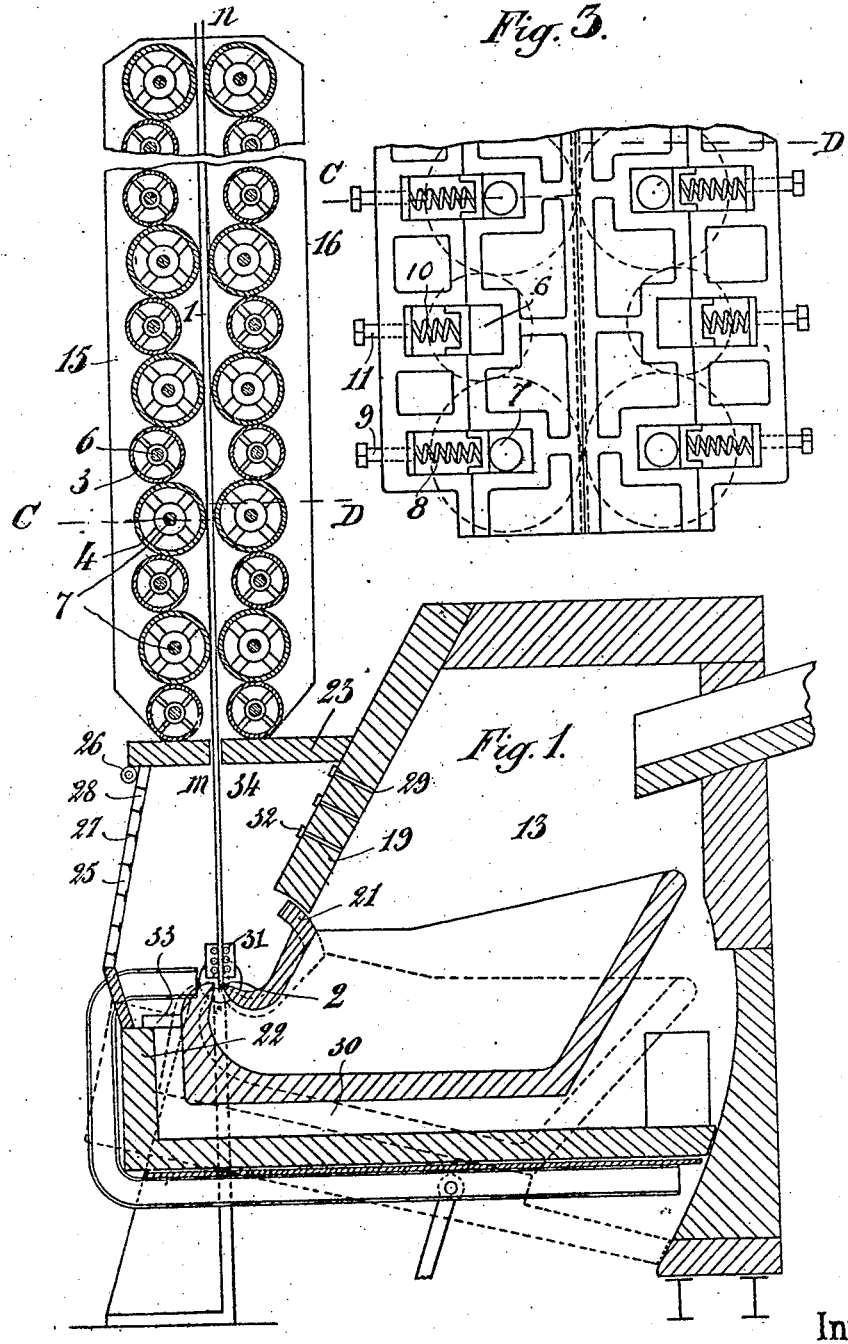

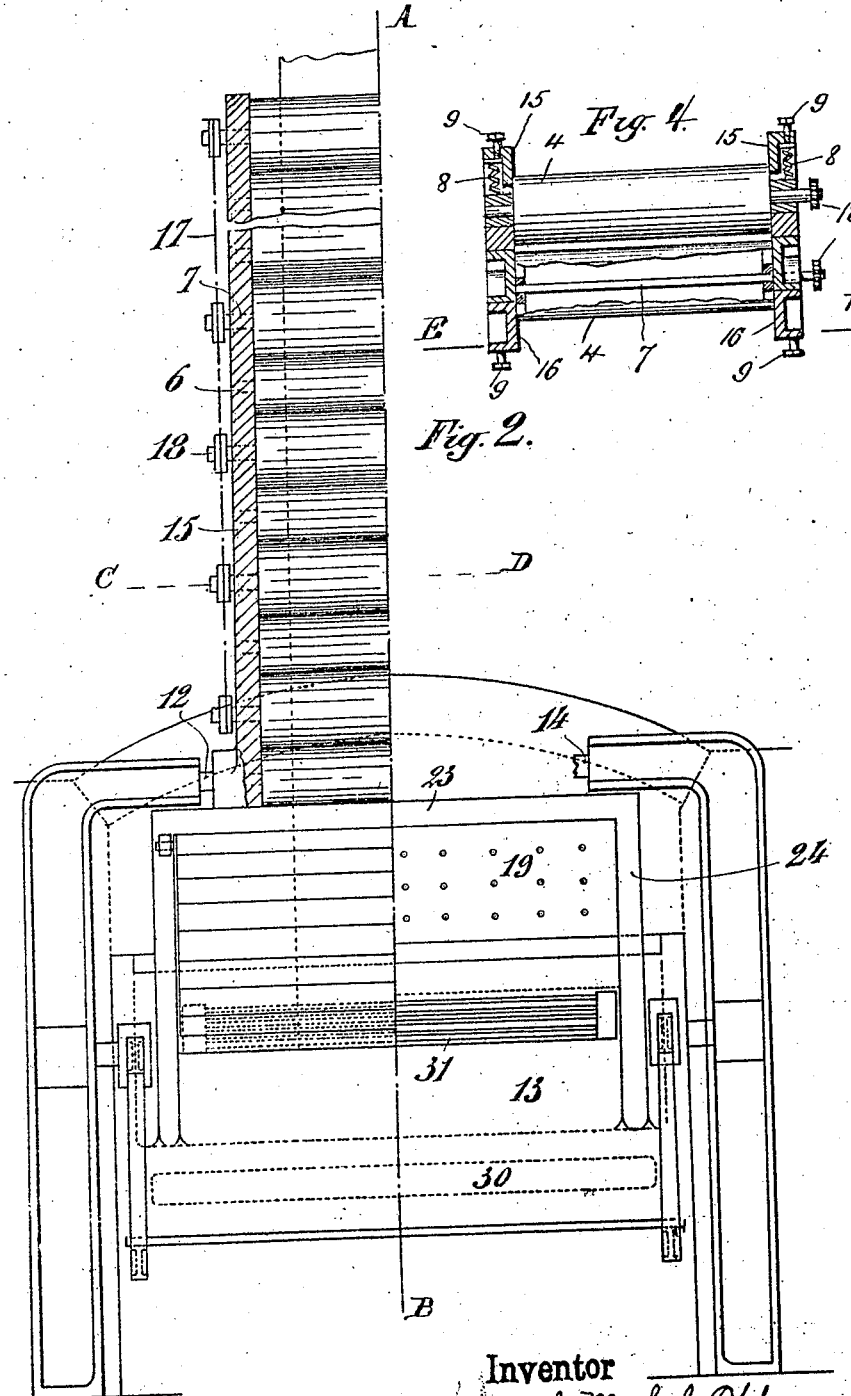

FREDERICK MICHEL OPPERMANN, OF ST. SERVAIS, BELGIUM.

MODE AND MEANS FOR MANUFACTURE OF SHEET-GLASS.

954,457. Specification of Letters Patent. Patented Apr. 12, 1910.

Application filed September 27, 1907. Serial No. 394,871.

*To all whom it may concern:*

Be it known that I, FREDERICK MICHEL OPPERMANN, a citizen of the United States of America, residing at St. Servais, near Namur, Belgium, have invented certain new and useful Improvements in the Mode and Means for Manufacture of Sheet-Glass; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in the mode of and means for the manufacture of sheet glass, and refers particularly to the cooling of the piece of glass which is obtained in an oven for the mechanical manufacture of sheet glass and in which the slot of issue coincides with the axis of rotation of the movable pot, as described in my Patent No. 915,879, dated March 23, 1909.

The cooling is not effected in a vertical chamber or chimney, the word chimney being used as meaning a vertical or inclined tube in which is produced a draft under the influence of differences of temperatures. In the present arrangement all draft is suppressed, and the gradual reduction of temperature of the sheet of glass formed is brought about by means of hollow or solid cylinders maintained at the required temperature. These cylinders are of two kinds, some guiding, supporting or drawing the sheet of glass, while others are interposed between the first ones to form a joint and prevent the air circulation from contact with the formed sheet glass. In other words, the sheet of glass as it leaves the pot passes between two series of opposed operative surfaces contacting with the glass, the surfaces of each series being distanced from one another, and there are maintained bodies of air entrapped between the adjacent surfaces of each series and the sheet of glass as it is drawn from the pot, to prevent the passage of air currents along the face of the glass sheet.

The drawings accompanying this specification show the application of the system to the oven described in my Patent No. 915,879, hereinabove referred to, wherein the sheet of glass is drawn toward the top, or in an upward direction. The same system may be applied when the sheet of glass is directed downward or drawn toward the bottom.

In order that this invention may be clearly understood and more easily carried into practice, I have appended hereunto drawings in which I have illustrated the nature of my said improvements.

Figure 1 is a vertical transverse section of the oven on the line A—B of Fig. 2; Fig. 2 is a view partly in front elevation and partly in section on line E—F, Fig. 4. Fig. 3 is an enlarged view showing the disposition of the axes of the rollers, and Fig. 4 is a section on line C—D, Figs. 2 and 3.

In carrying this invention into practice two vertical frames, 15 and 16, which are placed in the vertical plane of the axis of rotation of the pot 13, turn on each of the axes 12 and 14 parallel to the axis of rotation of the pot 13. These frames are maintained in the position shown in the drawing by any suitable means. They carry the axes 6 and 7 of the metallic rollers 4 and 3. These axes 6 and 7 are carried by movable bearings urged toward the meeting edges $m$ $n$ of the frames 15 and 16 by means of springs 8 and 10, the tension of which may be regulated by the screws 9 and 11.

The sheet of glass 1, coming out of the slot 2 moves in the vertical plane through the axis of rotation of the pot, and is drawn and guided by the rollers 4 through the cooling arrangement of leer 15—16.

The ends of the rollers 3 and 4 are set close to the frames 15 and 16 to prevent the passage of air currents as much as possible, and the rollers 3 and 4 placed all along these frames alternately, being tangent to each other, permit the sheet of glass to displace itself in a succession of spaces entirely closed. Each of the rollers 3 and 4 can be cooled down or heated in any way, either internally or externally. These rollers are driven by endless chains or cables 17, actuated by cog or other wheels 18 fixed on the axes 6 and 7 of the rollers. Any one of each of these series of axes can be driven by any suitable form of motor.

The described mode of suspension of the frames 15 and 16 permits them to swing around the axes 12 and 14 to draw the rollers 4 away from the formed sheet of glass, which permits, in case of the sheet glass breaking, to readily let the broken glass drop and to rapidly begin again the operation by bringing the frames, and consequently the rollers into the position shown in the drawings.

The various rollers not being inclosed in a box or chimney, it is easy to watch them constantly, and if necessary, to replace them.

It is advantageous to have, as shown, between the first rollers 4 and the slot of issue 2, a closed chamber 34, in which the sheet of glass is annealed after it has undergone a first or partial cooling down under the action of radiation of tubes 31 placed near the slot and in which a cold liquid circulates. This chamber 34 is formed at the back by the front part 19 of the oven, toward the bottom by the parts 21 and 22 of the movable pot 13, at the top and on the sides by fire-proof walls 23 and 24 secured to the oven, and in front by a movable panel or door 25 turning or swinging on pivots 26. This door 25 is formed by an iron frame carrying on T-irons mica sheets 28, which permit the interior of the chamber 34 to be inspected. This chamber can be more or less heated by openings 29 provided in the front wall 19 of the oven and by its communication with the hot gas channel 30 enveloping the movable pot 13. These openings 30 and 29 can be closed by means of the stoppers 32 or 33, when desired.

I claim—

1. The combination with a furnace and a pot having a glass supply slot through which the molten glass is forced; of a set of cylinders on each side of the plate being drawn, frames in which said cylinders are mounted, and elements coöperating with the cylinders and out of contact with the glass forming closed chambers into which the sheet is drawn after leaving the pot, whereby currents of air are prevented from passing along the sheet.

2. The combination with a furnace and a pot having a glass supply slot through which the molten glass is forced upward; of a set of rolls one on each side of the plate being drawn, comprising drawing rolls contacting with the sheet and intermediate rolls contacting with the drawing rolls.

3. The combination with a furnace and a pouring pot therein having a glass supply slot through which the molten glass is poured; of a set of rolls one on each side of the plate being drawn, comprising drawing rolls contacting with the sheet and intermediate rolls contacting with the drawing rolls, and means to move each set of rolls as an entirety out of operative position.

4. The combination with a furnace and a rotatable pot having a glass supply slot approximately at the center of rotation, said pot forming part of the front of the furnace; of means proximate the slot for setting the glass, and an annealing chamber over the slot and in front of the furnace.

5. The combination with a furnace and a rotatable pouring pot therein having a glass supply slot, said pot forming part of the front of the furnace; of means proximate the slot for setting the glass, an annealing chamber over the slot, and means in the annealing chamber to prevent air currents from passing over the face of the glass.

6. The combination with a furnace and a pouring pot therein having a glass supply slot outside of the furnace, said pot forming part of the front wall of the furnace; of means proximate to the slot to set the glass, an annealing chamber within which said slot and cooling means are located, and regulable means to admit gases from the furnace to said chamber.

7. The combination in glass drawing mechanism, of drawing means comprising a set of cylinders on each side of the glass, the alternate cylinder of each set engaging the sheet of glass and auxiliary cylinders between and contacting with the adjacent cylinders, and vertical side frames in which the cylinders are mounted.

8. In glass drawing mechanism, means for drawing a sheet of glass, comprising a series of operative surfaces contacting with and moving with the glass, means to cover the ends of said surfaces, the spaces between them and the edges of the sheet of glass, and moving elements coöperating with said surfaces out of contact with the glass to form a series of closed chambers adjacent the glass sheet as it is being drawn, whereby upwardly moving currents of air adjacent the glass are prevented.

9. The process of drawing sheet glass, which consists in progressing the sheet between series of opposed operative surfaces contacting with the glass, the surfaces of each series being distanced from one another, and maintaining bodies of air entrapped between adjacent surfaces of each series and the glass being drawn, and preventing thereby passage of air along the faces of the glass as it is being drawn.

10. The combination with a furnace and a pouring pot therein having a glass supply slot outside of the furnace and rotatable about the slot as a center; of means proximate the slot to set the glass as it is being poured from the slot, sets of cylinders engaging the glass on both sides and means in which said cylinders are mounted, said means being mounted to swing on arcs parallel to the axis of rotation of the slot.

In testimony that I claim the foregoing as my invention, I have signed my name in presence of two subscribing witnesses.

FREDERICK MICHEL OPPERMANN.

Witnesses:
GEORGES VANDER HAEGHEN,
JULES GHILAIN.